Nov. 10, 1925.
R. W. SPENCER
1,561,033
PIPE JOINT
Filed July 23, 1925
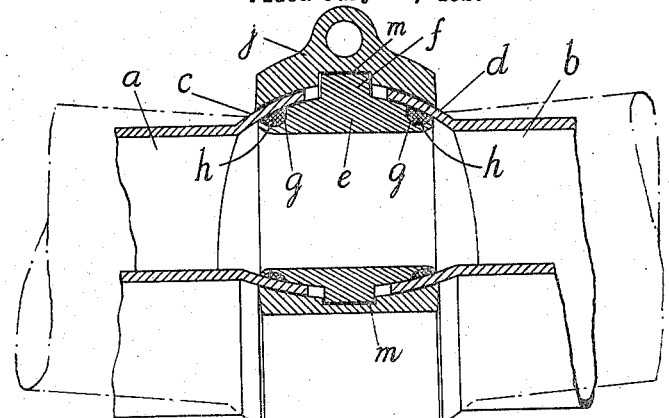
FIG. 1
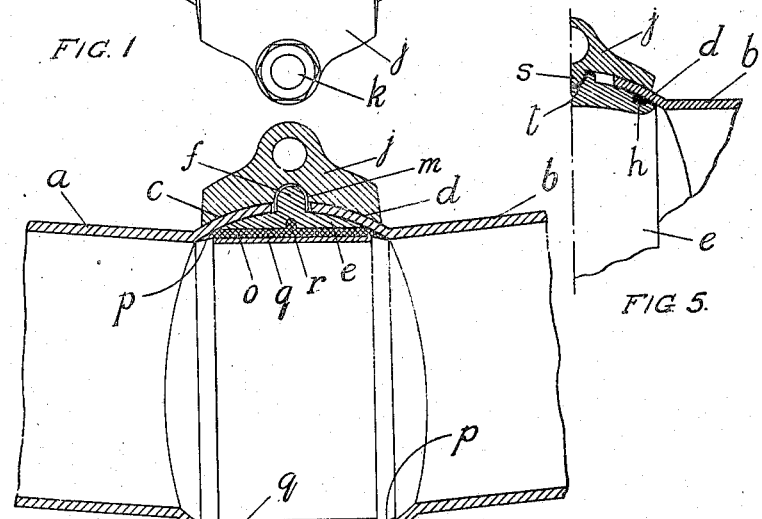
FIG. 2
FIG. 5
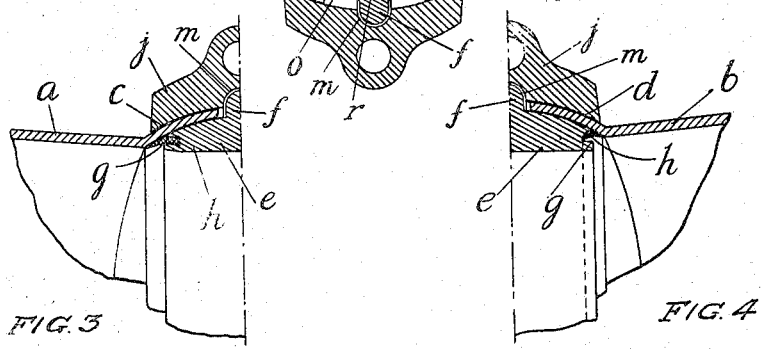
FIG. 3
FIG. 4
Inventor
REGINALD WILLIAM SPENCER,
By Toulmin & Toulmin,
ATTORNEYS Patented Nov. 10, 1925.

1,561,033

UNITED STATES PATENT OFFICE.

REGINALD WILLIAM SPENCER, OF SOUTH KIRKBY, NEAR PONTEFRACT, ENGLAND.

PIPE JOINT.

Application filed July 23, 1925. Serial No. 45,520.

*To all whom it may concern:*

Be it known that I, REGINALD WILLIAM SPENCER, of 100 West Street, South Kirkby, near Pontefract, in the county of York, England, British subject, have invented certain new and useful Improvements in or Relating to Pipe Joints (for which I have filed an application in Great Britain, 21st March, 1924, No. 7265), of which the following is a specification.

This invention relates to means for coupling together two pipes or the like, and is of the type in which the adjacent ends of the pipes are splayed outwards or provided with sockets having spherical surfaces and enclose an inner hollow spherical member, whereby all the spherical surfaces of the joint have a common center.

In a known construction of the above indicated type, the spherical ends of the pipes are connected together about fixed pivots carried by the inner hollow spherical member so that the spherical ends of the pipes can move over the hollow spherical member, but owing to their fixed pivotal connection, the spherical ends are so restrained that they can move out of axial alignment only in one plane and this type of joint is, therefore, limited in its use.

For example, where lengths of pipes are joined together and the joints, after being fixed, are subjected to movement through any causes such as depression of ground in, or on, which they are laid, if such movement was in a plane at an angle to that in which the movement of the pipes is permissible, the joint could not adapt itself and/or give with the ground depression and would become liable to break or leak. Further, immediately the pipes become out of alignment the inner hollow spherical member obstructs the continuity of the bore of the pipes.

This invention is characterized in that the spherical ends of the pipes are held between spherical bearing surfaces formed by the inner spherical member and an outer securing member, the spherical surfaces of both members extending across the gap between the pipes, whereby the pipes can be moved in any plane about the common center of the joint. The invention is further characterized in that the inner spherical member is provided with an annular flange located between the spherical ends of the pipes, which flange engages an annular recess in the outer member so that both inner and outer members can move or adjust themselves together in relation to the movement of the pipes whilst ensuring a clear and unobstructed continuity of the bore of the pipes.

Referring to the drawings filed herewith:—

Fig. 1 is a longitudinal sectional elevation of one form of device made in accordance with this invention showing two pipes coupled together; and Fig. 2 is a similar view of a modified form; and Figs. 3, 4 and 5 are detail views of further modified forms.

In Fig. 1, *a*, *b* are two pipes whose meeting ends *c* and *d* are splayed outwardly to form sockets having interior and exterior faces forming part of a circle or sphere. Inside the two meeting ends is centrally disposed an inner hollow spherical or annular member *e* whose exterior periphery is part of a sphere so as to form a bearing for, and spanning the gap between, the ends of the pipes so as to swivel therein about a center common to the ends of the pipes. On the member *e* is an annular flange *f* which is located between the meeting ends of the pipes. In each end of the spherical member is an annular groove *g* to receive a resilient ring or packing *h* which, in the example shown, is round in cross section and forms a fluid tight joint between the ends of the pipes and the spherical member *e*. Surrounding the outer spherical surfaces of the pipes and spanning the gap therebetween in like manner to the member *e* is a securing ring or clip *j* made in halves bolted together by bolts *k* and having an inner spherical surface bearing on the ends of the two pipes. This ring or clip *j* is provided interiorly with a central annular groove *m* adapted to receive the annular flange *f* of the member *e*.

For effecting a fluid tight joint, the two halves of the ring or clip are bolted securely together and on any subsequent movement of the pipes or clip taking place, the joint, having a common center, permits the ends of the pipe to move on their bearing surfaces between the clip *j* and spherical member *e*, the clip and spherical member being prevented from movement with respect to each other by the annular flange and groove engagement of one with the other.

The grooves *g* in the spherical member *e* may be of any suitable shape so as to house a ring or packing $h$ of any suitable shape or cross section, as for instance as shown in Figs. 3 and 4, in which the grooves are shown in the end faces of the member $e$.

Further, the mouth of each groove $g$ shown in Fig. 3, may be narrowed as shown, so as to more tightly grip the packing $h$ and prevent displacement.

In some cases the securing ring or clip $j$ may be provided with an annular flange $s$ as shown in Fig. 5 adapted to engage an annular recess $t$ in the spherical member $e$. This construction considerably strengthens the securing ring $j$ whilst also reducing its greatest diameter.

In Fig. 2, the spherical member $e$ is provided interiorly with a concentric resilient ring $o$ of rubber or other suitable material having a feather edged formation $p$ at each end to form a fluid tight seal within the pipes. Retaining this ring $o$ in position is a spring ring $q$. The resilient ring $o$ is also provided with an annular flange $r$ engaging an annular groove in the inner surface of the spherical member $e$ to prevent displacement.

A little clearance may be left in the groove $m$ housing the flange $f$ of the spherical member $e$ so as to ensure the clip tightly gripping the ends of the pipes and not the member $e$.

It will, therefore, be seen that the joint has a common center about which the several parts can move so as to adjust themselves to the varying directions of the axes of the two connected pipes and that the pipes can move out of alignment in any plane.

It is also to be understood that any form of securing clip or clamp may be used providing it has an interior spherical surface.

What I claim and desire to secure by Letters Patent is:—

1. Means for connecting two pipes together comprising an outer member and an inner member having concentrically adjacent interior and exterior spherical surfaces, spherical ends to the pipes located in opposed relation to one another between said spherical surfaces, a flange and groove engagement between the outer member and the inner member located between the meeting ends of the pipes, means associated with the inner member for resiliently effecting a fluid tight joint within the pipe ends.

2. Means for connecting two pipes together comprising an outer member and an inner member having concentrically adjacent interior and exterior spherical surfaces, spherical ends to the pipes located in opposed relation to one another between said spherical surfaces, a flange and groove engagement between the outer member and the inner member located between the meeting ends of the pipes, resilient packing medium carried by the inner member in abutting relation to the spherical ends of the pipes.

3. Means for connecting two pipes together comprising an outer member and an inner member having concentrically adjacent interior and exterior spherical surfaces, spherical ends to the pipes located in opposed relation to one another between said spherical surfaces, a flange and groove engagement between the outer member and the inner member located between the meeting ends of the pipes, resilient packing medium housed annularly in the inner member in abutting relation to the spherical ends of the pipes.

4. Means for connecting two pipes together comprising an outer member and an inner member having concentrically adjacent interior and exterior spherical surfaces, spherical ends to the pipes located in opposed relation to one another between said spherical surfaces, a flange and groove engagement between the outer member and the inner member located between the meeting ends of the pipes, resilient packing medium housed concentric to the inner member in abutting relation to the spherical ends of the pipes.

5. Means for connecting two pipes together comprising an outer member and an inner member having concentrically adjacent interior and exterior spherical surfaces, spherical ends to the pipes located in opposed relation to one another between said spherical surfaces, an annular flange on the inner member located between the meeting ends of the pipes and abutting in a recess in the outer member, resilient packing medium carried by the inner member in abutting relation to the spherical ends of the pipes.

6. Means for connecting two pipes together comprising an outer member and an inner member having concentrically adjacent interior and exterior spherical surfaces, spherical ends to the pipes located in opposed relation to one another between said spherical surfaces, an annular flange on the outer member located between the meeting ends of the pipes and abutting in a recess in the inner member, resilient packing medium carried by the inner member in abutting relation to the spherical ends of the pipes.

7. Means for connecting two pipes together comprising an annular outer member interiorly spherical, a hollow spherical inner member concentric with the outer member, spherical ends to the pipes located between said inner and outer members, a flange and groove engagement between the outer member and the inner member and located between the meeting ends of the pipes, resilient packing medium carried by the inner member in abutting relation to the spherical ends of the pipes.

8. Means for connecting two pipes together comprising an annular outer member interiorly spherical, a hollow spherical inner member concentric with the outer member, spherical ends to the pipes located between said inner and outer members, a flange and groove engagement between the outer member and the inner member and located between the meeting ends of the pipes, resilient packing medium carried by the inner member in abutting relation to the spherical ends of the pipes.

9. Means for connecting two pipes together comprising an annular outer member interiorly spherical, a hollow spherical inner member concentric with the outer member, spherical ends to the pipes located between said inner and outer members, a flange and groove engagement between the outer member and the inner member and located between the meeting ends of the pipes, resilient packing medium housed annularly in the inner member in abutting relation to the spherical ends of the pipes.

10. Means for connecting two pipes together comprising an annular outer member interiorly spherical, a hollow spherical inner member concentric with the outer member, spherical ends to the pipes located between said inner and outer members, a flange and groove engagement between the outer member and the inner member and located between the meeting ends of the pipes, resilient packing medium housed concentric to the inner member in abutting relation to the spherical ends of the pipes.

In testimony whereof, I affix my signature.

REGINALD WILLIAM SPENCER.